(12) United States Patent
Kuenkler et al.

(10) Patent No.: US 9,145,171 B2
(45) Date of Patent: Sep. 29, 2015

(54) REAR BODY SECTION OF A MOTOR VEHICLE HAVING A REINFORCING STRUCTURE

(71) Applicant: GM GLOBAL TECHNOLOGY OPERATIONS LLC, Detroit, MI (US)

(72) Inventors: Boris Kuenkler, Limburg (DE); Karsten Bohle, Bad Schwalbach (DE); Lothar Harzheim, Mainz (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 14/268,910

(22) Filed: May 2, 2014

(65) Prior Publication Data
US 2015/0054309 A1 Feb. 26, 2015

(30) Foreign Application Priority Data
May 2, 2013 (DE) .................... 20 2013 004 133 U

(51) Int. Cl.
*B62D 25/08* (2006.01)
*B62D 25/02* (2006.01)
*B62D 21/15* (2006.01)
*B62D 25/04* (2006.01)
*B62D 27/02* (2006.01)

(52) U.S. Cl.
CPC .............. *B62D 25/02* (2013.01); *B62D 21/152* (2013.01); *B62D 25/04* (2013.01); *B62D 25/08* (2013.01); *B62D 25/088* (2013.01); *B62D 27/02* (2013.01)

(58) Field of Classification Search
CPC ........ B62D 25/08; B62D 25/02; B62D 27/02; B62D 27/023

USPC ............ 296/203.01, 203.03, 203.04, 187.11, 296/187.12, 193.06, 198
See application file for complete search history.

(56) References Cited

U.S. PATENT DOCUMENTS

| 1,498,234 | A | * | 6/1924 | Childs ...................... 296/203.01 |
| 1,523,636 | A | * | 1/1925 | Dunn ....................... 296/203.01 |
| 2,356,690 | A | * | 8/1944 | Perkins .................... 296/203.01 |
| 4,875,733 | A | * | 10/1989 | Chado et al. ............. 296/203.04 |
| 4,973,103 | A | * | 11/1990 | Imajyo et al. ............ 296/203.04 |
| 5,228,741 | A | * | 7/1993 | Ide ........................... 296/187.11 |
| 8,011,719 | B2 | * | 9/2011 | Walter et al. ............. 296/203.04 |
| 2011/0133515 | A1 | * | 6/2011 | Mori ........................ 296/193.06 |

FOREIGN PATENT DOCUMENTS

DE 19737242 A1 3/1999
DE 602004009938 T2 8/2008

(Continued)

OTHER PUBLICATIONS

German Search Report dated Nov. 12, 2013 issued in German Patent Application No. 202013004133.1.

*Primary Examiner* — Dennis H Pedder
(74) *Attorney, Agent, or Firm* — Ingrassia Fisher & Lorenz PC

(57) ABSTRACT

A motor vehicle having a rear vehicle body with a reinforcing structure is disclosed. The reinforcing structure includes at least two legs starting out from a common center. A face side formed by each of the legs is at least partially structurally connected with a side wall of the rear vehicle body. The reinforcing structure has a section which over at least a portion of the reinforcing structure includes a top-hat shaped cross section having material sections which projecting laterally towards the outside at least partially serve as a flange for fastening to the side wall or another part of the vehicle body.

13 Claims, 3 Drawing Sheets

(56) References Cited

FOREIGN PATENT DOCUMENTS

| | | | |
|---|---|---|---|
| DE | 102007035495 A1 | 1/2009 |
| DE | 102008020527 A1 | 10/2009 |
| DE | 102009048254 A1 | 6/2010 |
| DE | 102010014574 A1 | 10/2011 |

* cited by examiner

REAR BODY SECTION OF A MOTOR VEHICLE HAVING A REINFORCING STRUCTURE

CROSS REFERENCE TO RELATED APPLICATION

This application claims priority to German Patent Application No. 202013004133.1 filed May 2, 2013, which is incorporated herein by reference in its entirety.

TECHNICAL FIELD

The present disclosure relates to a rear car for a motor vehicle with at least one reinforcing structure. The present disclosure furthermore relates to a vehicle body with such a rear car.

BACKGROUND

In the development of modern vehicles there is an endeavor to improve the crash behavior of the vehicles in particular in order to achieve a best possible protection of occupants.

Before this background the present disclosure is based on the object of providing a rear car for a motor vehicle with the features mentioned at the outset which with respect to a rear-end collision is optimized in its stiffening.

SUMMARY

This object is solved with a rear car for a motor vehicle with at least one reinforcing structure, which includes at least two legs starting out from a common center and which are at least partially structurally connected with a face side formed by the legs to a side wall of the rear car. Furthermore, a vehicle body wherein at least one of the reinforcing profiles at least over a section includes a top-hat shaped cross section, whose material sections laterally projecting towards the outside at least partially serves as flange for fastening to the side wall or another part of the body. is proposed for solving the object. Advantageous configurations of the present disclosure are obtained from the claims, the following description and the figures.

A rear car for a motor vehicle is characterized among other things by at least one reinforcing structure, which includes at least two legs starting out from a common center and with a face side formed by the legs is structurally connected at least partially to a side wall of the rear car.

Through this design of the reinforcing structure it is assigned a greater stiffening effect which because of the face-side connection to the side wall is effectively transmitted to the body structure of the rear car. Because of this, the vehicle rear is stiffened. Because of this, the rear car additionally provides a deformation behavior which is optimized for a rear-end collision.

According to a configuration it is provided that the reinforcing structure is formed X-shaped or Y-shaped and the center and the legs are formed by the X-shape or Y-shape. Through the X-shaped or Y-shaped design of the reinforcing structure it is assigned a particularly high stiffening effect which because of the face-side connection to the side wall is particularly effectively transmitted to the body structure of the rear car. Because of this, the vehicle rear is stiffened particularly well. Because of this, the rear wall also provides a deformation behavior which is particularly optimized for a rear-end collision.

The measure that the reinforcing structure is formed Z-shaped, V-shaped, W-shaped or U-shaped also aims in the same direction. It is decisive that the reinforcing structure includes the at least two legs which meet in the common center. The reinforcing effect particularly through the center causes the reinforcing effect which forms a nodal point for the legs meeting therein.

The reinforcing structure can be structurally connected to the side wall by means of spot welding, punch riveting, clinching or similar materially-joined and/or positively-joined connecting methods so that this type of connection of the reinforcing structure to the rear car can be realized in a technically simple manner.

It is also conceivable that additionally or alternatively the reinforcing structure is structurally connected to the side wall by means of a non-positively joined connection method.

A possibility is that the reinforcing structure is structurally connected to an inner side wall with the face side. Because of this, particularly good stiffening of the rear part can be achieved since as side wall the inner side wall is utilized, which substantially serves as support structure, in particular for further components of the vehicle body.

It can also be provided that the reinforcing structure is structurally connected to an outer side wall, in particular to the outer skin of the vehicle body.

According to a configuration it is provided that the side wall includes a through-opening, in particular for a side window, which is arranged in the side wall of the two legs of the reinforcing structure. Through the through-opening or the cutout in the side wall provided in this manner the stiffening of the rear car is retained, which is brought about through the reinforcing structure. Through the reinforcing structure the forming of a through-opening in the side wall can thus be realized in a simple manner without the body stiffness of the rear car being impaired because of this. In this regard, no further measures such as for example additional reinforcing structures have to be provided in the region of the cutout.

The reinforcing structure brings about a good stiffening of the rear car, when according to a configuration the reinforcing structure, in particular with at least one leg, extends as far as to the preferentially lateral roof frame and/or a C-pillar, in particular towards the top, in particular is structurally connected thereon.

The measure when according to a further configuration the reinforcing structure, in particular with at least one leg, extends as far as to the preferentially lateral roof frame and/or a D-pillar, in particular towards the top, in particular is structurally connected thereon, aims in the same direction.

The measure, according to which according to a further configuration the reinforcing structure extends in particular with at least one leg as far as to a preferentially lateral sill, in particular towards the bottom, in particular is structurally connected thereon, also aims in this direction.

The reinforcing structure, in particular with at least one leg, can also extend as far as to a wheel housing, in particular be structurally connected thereon. In particular, an optimal absorption of the wheel forces introduced via the wheel housing and the undercarriage of the vehicle body is possible because of this. The stiffness of a shock absorber connection attached to the wheel housing is also improved because of this.

Altogether, the deformation behavior of the rear car during a rear-end collision is optimized through the connection of the reinforcing structure to the aforementioned components of the vehicle body in that the region between a tail gate and a rear door of the motor vehicle is stabilized and a rising-up of the vehicle frame in the event of a crash is thus impeded. These measures also contribute to a further torsional stiffening of the body.

Provided that the reinforcing structure extends as far as to the wheel housing it can be additionally provided that for example the leg of the reinforcing structure, which extends as far as to said wheel housing, hugs a section of the wheel housing, thereby having an additional reinforcing effect on the wheel housing.

According to a configuration, the reinforcing structure includes at least two, preferentially three reinforcing profiles or is formed thereof. The reinforcing profiles can be structurally interconnected in the center of the reinforcing structure subject to forming an intersection region, in particular be structurally connected by means of spot welding, punch riveting, clinching or similar materially joined and/or positively joined connecting methods. Because of this, the reinforcing structure with its X-shaped configuration can be realized in a technically simple manner.

The measure that one of the reinforcing profiles continuously extends through the intersection region and, preferentially on opposite sides, the other reinforcing profiles are structurally connected thereon in particular in the intersection region aims in the same direction. In that one of the reinforcing profiles extends through the intersection region the reinforcing structure formed through the reinforcing profiles has a high stability in the intersection region.

A further configuration consists in that one of the reinforcing profiles extends continuously through the intersection region. The reinforcing profile with its one long-side end extends as far as to a sill or the sill of the type described above towards the bottom, in particular is structurally connected thereon, and with its other long-side end extends as far as to a D-pillar or the D-pillar of the type described above towards the top, in particular is connected thereon.

A further development can consist in that one of the reinforcing profiles with its longitudinal extension hugs a wheel housing or the wheel housing of the type described above and extends as far as to a sill or the sill of the type described above, in particular is structurally connected thereon.

A further configuration can consist in that one of the reinforcing profiles extends as far as to the preferentially lateral roof frame and/or a C-pillar or the C-pillar of the type described above towards the top, in particular is structurally connected thereon and another one of the reinforcing profiles extends as far as to a wheel housing or the wheel housing of the type described above towards the bottom, in particular is structurally connected thereon. Because of this, a high degree of stiffening of the rear car is achieved. In particular, optimal absorption of the wheel forces introduced into the vehicle body via the wheel housing and the undercarriage is made possible because of this and the stiffness on a shock absorber connection which is attached to the wheel housing, increased. The deformation behavior of the vehicle during a rear-end collision, the so-called rear crash, is also improved because of this, for the reinforcing profiles formed in this manner lead to a stabilization of the entire rear car, so that particularly the region between a tail flap and a rear door is shape-stabilized in such a manner that in the event of a crash a rising-up of the vehicle frame is impeded.

A further stabilization and stiffening of the rear car can be achieved in that at least one of the reinforcing profiles includes a top-hat shaped cross section at least over a section, whose material sections laterally projecting to the outside partly serve as a flange for fastening to the side wall or to another part of the body. Such a cross-sectional structure improves the bending stiffness of the reinforcing profile. Through the laterally projecting material sections a good connection to the side wall is additionally made possible so that the high bending stiffness of the reinforcing profile has a particularly reinforcing effect on the side wall connected thereon.

Also encompassed is a vehicle body, which includes a rear car of the type described above.

Through the vehicle body the body stiffness, in particular in the region of the rear car, is improved and thus optimized driving dynamics, an optimized rear crash performance and an optimized noise behavior is achieved and the fatigue strength of the vehicle body optimized.

Through the vehicle body a mass-efficient improvement of the torsional rigidity of the vehicle body, in particular of the rear car, is additionally achieved since mass-efficient reinforcing profiles can be made use of, which are utilized by the rear car. An improvement of the vertical and lateral stiffness of the body-side shock absorber and spring mounting is also achieved.

Through the vehicle body an improved deformation behavior of the motor vehicle during a rear-end collision is also obtained. Because of the reinforcing structure a weight reduction is additionally obtained, which is achieved since the body components which are employed in the rear car can be equipped with a reduced sheet metal thickness. Ultimately, this results in a production cost reduction because of the utilization of thinner metal sheets.

Altogether, the vehicle body, in particular the rear car, results in a significant increase of the torsional rigidity of the body and an improvement of the rear crash behavior with low mass of the additionally components of the rear car. Through the provided reinforcing structure a reduction of the total mass of the body is obtained, since reinforcements which are substantial with respect to weight can be omitted.

Through the vehicle body an advantage with respect to the tank filler neck is also obtained, for through the reinforcing structure provided between the vehicle outer skin and the vehicle interior the tank filler neck can be arranged located opposite the side wall, to which the reinforcing structure is connected. This installation space can be easily kept clear with the rear car since in this region no additional reinforcing structures are necessary.

BRIEF DESCRIPTION OF THE DRAWINGS

The present disclosure will hereinafter be described in conjunction with the following drawing figures, wherein like numerals denote like elements, and.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 1:
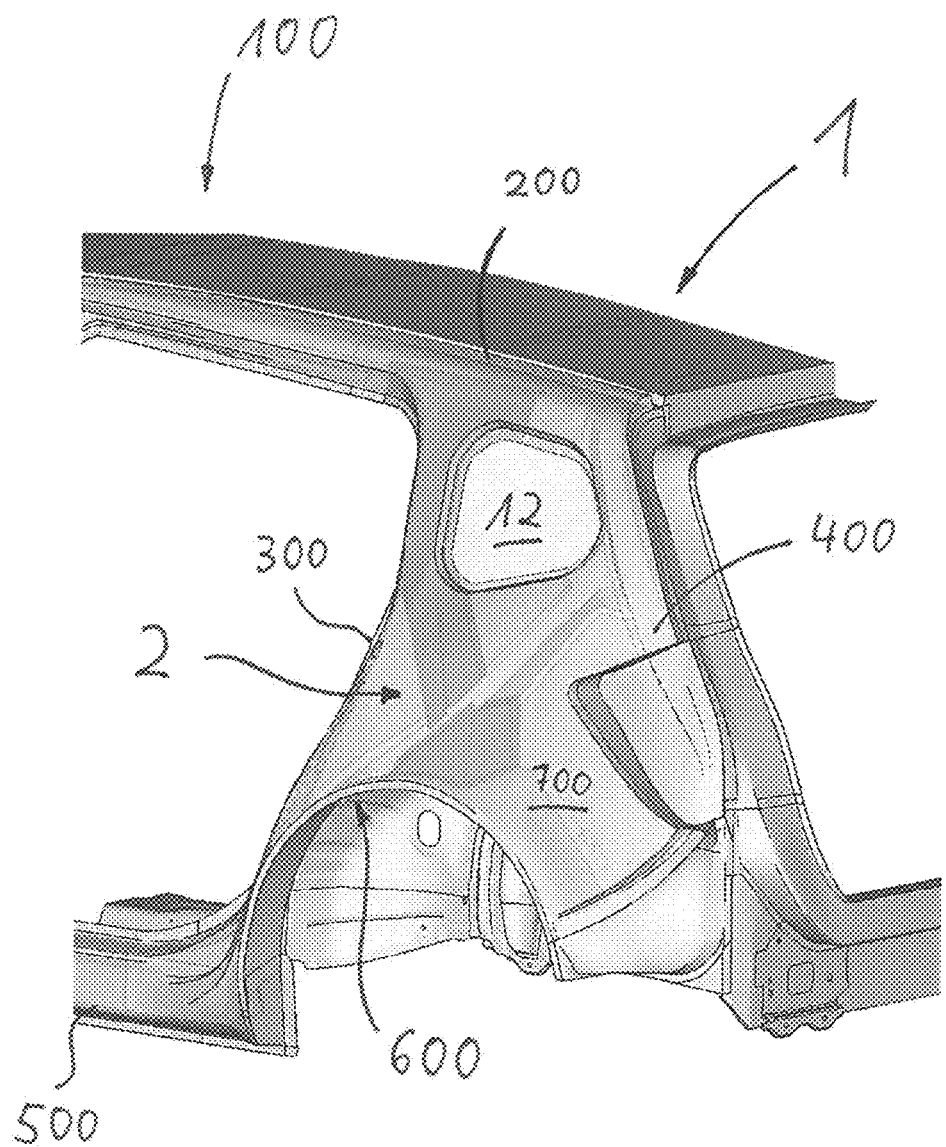
FIG. 1 shows a detail of a rear car of a vehicle body in a perspective representation with a possible embodiment of a reinforcing structure arranged between the outer skin and the inner wall of the vehicle body.

FIG. 1 shows—in a schematic representation—a part of the rear car 1 of a vehicle body 100 in a perspective view from the outside of a lateral region of the rear car 1. FIG. 1 substantially shows the region of the rear car 1 on a side of the vehicle body 100, which is located between the C-pillar 300 provided there and the D-pillar 400 provided there and which is followed towards the top by the roof frame 200 of the vehicle body 100. The region ends towards the bottom with the wheel housing 6 provided on the rear car 1, which is followed by a sill 500 in the direction of the vehicle front. The rear car 1 in this region is closed off towards the outside by an outer skin 700. In the outer skin 700 a through-opening 12 or a recess for receiving a side window is formed.

As is evident from FIG. 1, a reinforcing structure is arranged in the region between the C-pillar 300 and the D-pillar 400, which is accommodated between the outer skin 700 and the vehicle interior. The reinforcing structure 2 can be substantially formed X-shaped.

Figure 2:
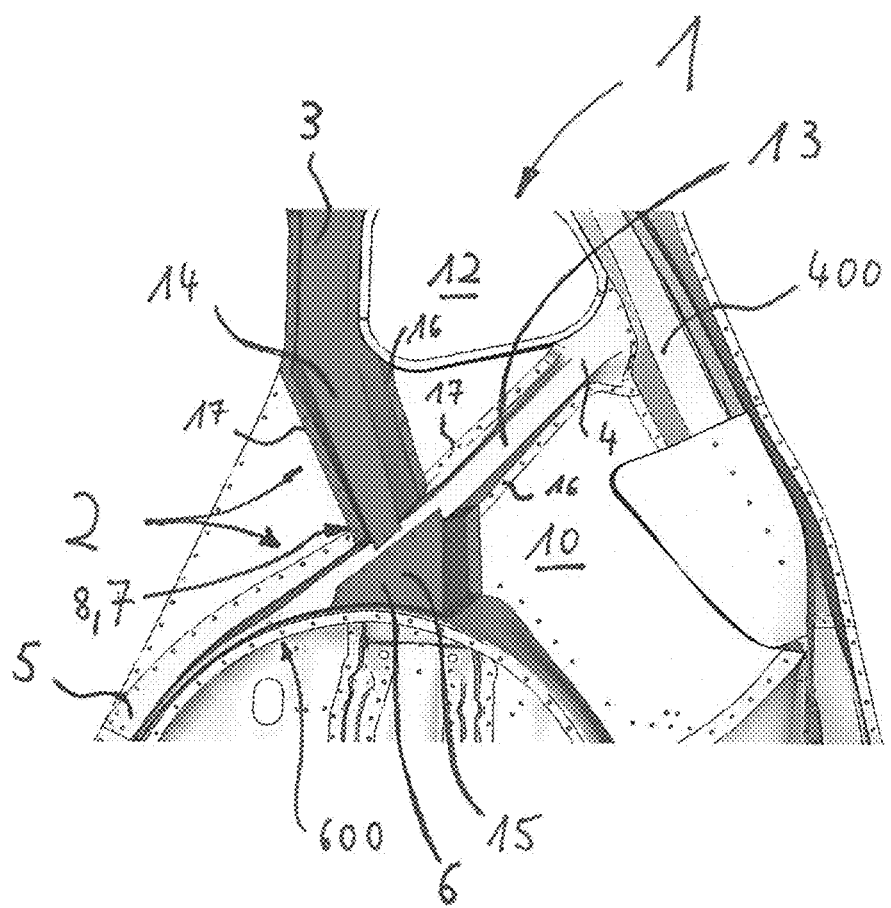
FIG. 2 shows a detail of the rear car according to FIG. 1 in the region of the reinforcing structure in a perspective representation.

FIG. 2 shows an enlarged detail of the rear car 1 in the region of the reinforcing structure 2. In FIG. 2 the outer skin 700 of FIG. 1 has been omitted for the sake of simplicity.

As is evident there, the reinforcing structure 2 is oriented in the direction against a side wall 10 with a face side formed through the X-shape, in particular brought to abut the side wall 10, preferentially structurally connected to the side wall 10. For example, the reinforcing structure 2 can be fastened to the side wall 10 by means of spot welding, punch riveting or clinching. The side wall 10 is preferably an inner side wall of the vehicle body 100, which closes off the side wall structure of the vehicle body 100 against the vehicle interior.

The reinforcing structure 2 because of its X-shaped design includes four legs 3, 4, 5 and 6, which starting out from a common center 8, in particular intersection region 7, extend away towards the outside. The legs 3 and 4 in this case are arranged in the manner that the through-opening 12 for the side window is positioned between the legs 3 and 4.

Figure 3:
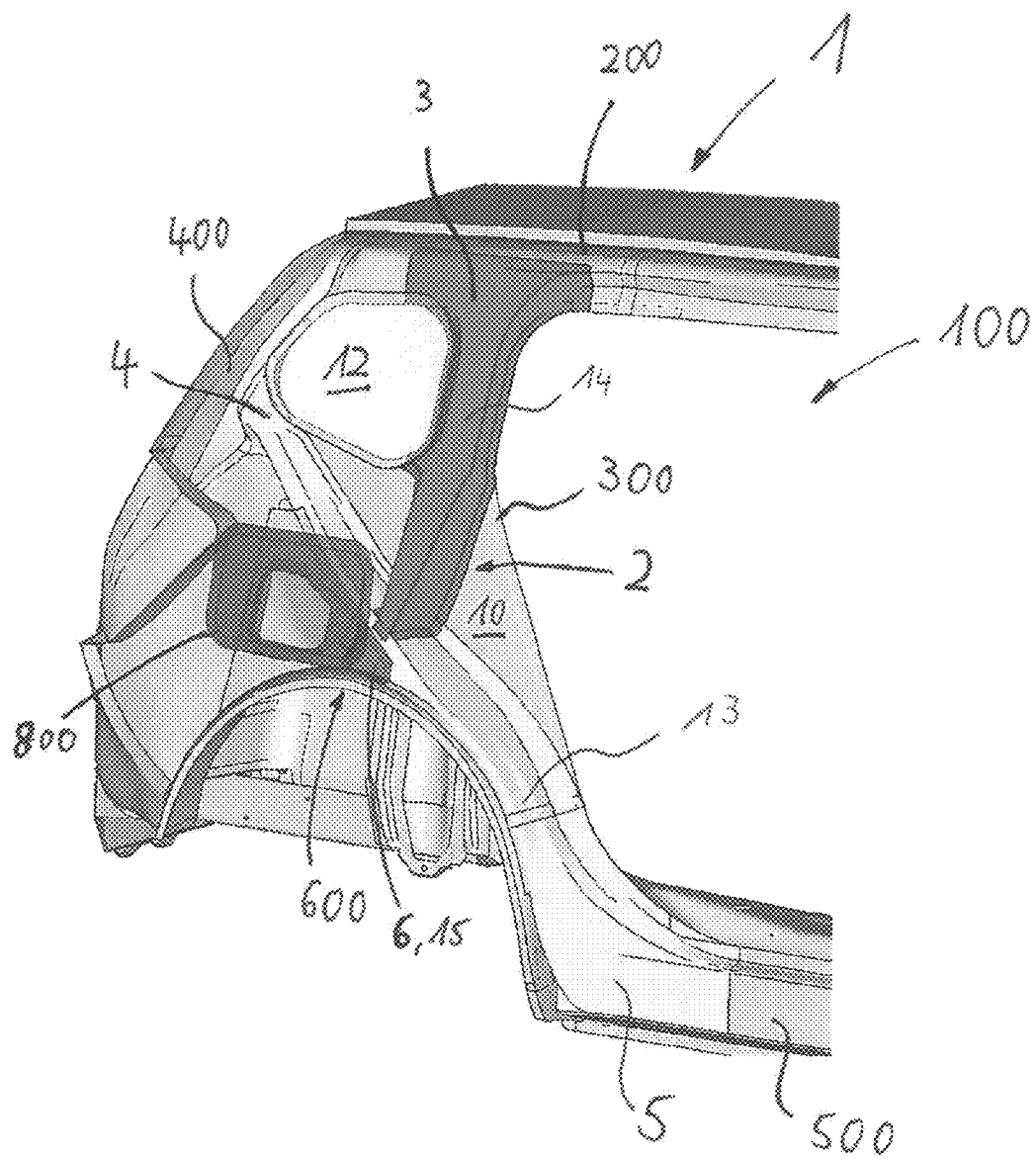
FIG. 3 shows the rear car with the reinforcing structure according to FIG. 1, shown without outer skin, in another perspective representation.

FIG. 3 shows the rear car 1 with the reinforcing structure 2 according to FIG. 1. In FIG. 3 the outer skin of the vehicle body 100 has been omitted for the sake of simplicity. As is evident in particular from FIG. 3 together with FIG. 2, the reinforcing structure 2 with the leg 3 extends as far as into the lateral region of the roof frame 200. Preferentially, the reinforcing structure 2 with its leg 3 is structurally connected to the roof frame 200, in particular fastened thereon by means of spot welding, punch riveting or clinching.

The reinforcing structure 2 furthermore extends with the leg 4 starting out from the intersection region 7 towards the top as far as to the D-pillar 400. Preferentially, the reinforcing structure 2 with the leg 4 is structurally connected to the D-pillar 400, in particular fastened by means of spot welding, punch riveting or clinching.

The reinforcing structure 2 extends with the leg 5 as far as to the sill or lateral sill 500. Preferably, the leg 5 extends at least over a section along a section of the wheel housing 600, wherein the leg 5 preferentially hugs the contour of the wheel housing 6 in this section. Preferably, the leg 5 with its end region is structurally connected to the sill 500, in particular fastened thereon by means of spot welding, punch riveting or clinching. Preferably, the leg 5 is structurally connected furthermore to the wheel housing 6 at least over a section, in particular fastened thereon by means of spot welding, punch riveting or clinching.

The reinforcing structure 2 extends with the leg 6 starting out from the intersection region 7 as far as to the wheel housing 600. Preferably, the leg 6 is structurally connected thereon, in particular fastened to the wheel housing 600 by means of spot welding, punch riveting or clinching.

As is shown in particular by the FIGS. 2 and 3, the reinforcing structure 2 can be formed by at least one, preferentially at least three reinforcing profiles 13, 14 and 15. One of the reinforcing profiles 13, 14 and 15 can continuously extend through the intersection region 7. The two other reinforcing profiles 14 and 15 are structurally connected on opposite sides of the reinforcing profile 13 in the intersection region 7 of the reinforcing structure 2, in particular fastened thereon together in particular by means of spot welding, punch riveting or clinching, and extend from there towards the outside. At least one of the reinforcing profiles 13, 14 and 15 has a substantially U-shaped cross section at least over a longitudinal section or a substantially top-hat shaped cross section. With the top-hat shaped cross section, the material sections which seen in cross section project laterally to the outside can be utilized as flange 16 and 17 for connecting to the side wall 10, as is evident for example from FIG. 2.

The legs 4 and 5 of the reinforcing structure 2 can be formed by the reinforcing profile 13, which continuously run through the intersection region 7. The leg 3 of the reinforcing structure 2 can be formed by the reinforcing profile 14. Furthermore, the leg 6 of the reinforcing structure 2 can be formed by the reinforcing profile 15.

As is evident from FIG. 3, the X-shaped reinforcing structure 2 makes it possible that no further stiffening structures are necessary in this region of the rear car, so that free installation space is created. This free installation space can be utilized through the arrangement of a tank filler neck or a tank filler 800, which can be arranged in the region of the legs 4 and 5, above the wheel housing 600. The tank filler 800 can be fastened to the outer skin 700 and project into the intermediate space between the outer skin 700 and the side wall 10, without colliding with the reinforcing structure 2 in the process.

Although the present disclosure was described with the help of at least one exemplary embodiment it is to be understood that a multiplicity of variants exist. It should also be noted that the exemplary embodiment or the exemplary embodiments are only examples and not intended to restrict the scope of protection, the applicability or executability or the construction in any way whatsoever. The above description provides the person skilled in the art with suitable instructions for implementing or executing at least one embodiment; it is to be understood that various changes in the function and arrangement of elements or components, which are described above in at least one exemplary embodiment, can be made without deviating from the scope of protection of the following claims and their legal equivalents.

The invention claimed is:

1. A rear body assembly for a motor vehicle with at least one reinforcing structure comprising at least two legs starting out from a common center and which are at least partially structurally connected with a face side formed by the legs to a side wall of a rear body panel, wherein the reinforcing structure comprises at least two reinforcing profiles, which subject to forming an intersection region in the center of the reinforcing structure are structurally connected to one another, and wherein one of the reinforcing profiles continuously extends through the intersection region, wherein the one reinforcing profile with a first longitudinal end extends as far as to a sill to towards a bottom and with a second longitudinal end extends as far as to a D-pillar towards a top.

2. The rear body assembly according to claim 1, wherein the reinforcing structure is formed X-shaped or Y-shaped and the center and the legs are formed through the X shape or Y-shape.

3. The rear body assembly according to claim 1, wherein the reinforcing structure is structurally connected with a face side to an inner side wall of the body panel.

4. The rear body assembly according to claim 1, wherein the side wall comprises a through-opening configured for a side window which is arranged between the legs of the reinforcing structure.

5. The rear body assembly according to claim 1, wherein at least one leg of the reinforcing structure extends as far as to a roof frame and is structurally connected thereon.

6. The rear body assembly according to claim 1, wherein at least one leg of the reinforcing structure extends as far as to a C-pillar and is structurally connected thereon.

7. The rear body assembly according to claim 1, wherein the one reinforcing structure that extends as far as to a D-pillar is structurally connected thereon.

8. The rear body assembly according to claim 1, wherein at least one leg of the reinforcing structure extends as far as to a sill and is structurally connected thereon.

9. The rear body assembly according to claim 1, wherein at least one leg of the reinforcing structure extends as far as to a wheel housing and is structurally connected thereon.

10. The rear body assembly according to claim 1, wherein the one reinforcing profile with a first longitudinal extension hugs a wheel housing.

11. The rear body assembly according to claim 1, wherein a first reinforcing profile extends as far as to the roof frame and/or a C-pillar towards the top and a second reinforcing profile extends as far as to a wheel housing towards the bottom.

12. The rear body assembly according to claim 1, wherein at least one of the reinforcing profiles comprises a top-hat shaped cross section, whose material sections laterally projecting towards an outside at least partially serve as a flange for fastening to the side wall.

13. A vehicle body with a rear body assembly according to claim 1.

* * * * *